United States Patent
Goswamee et al.

(10) Patent No.: US 10,839,437 B2
(45) Date of Patent: Nov. 17, 2020

(54) MANAGED PRINT SERVICES

(71) Applicants: Prabir Kumar Goswamee, Bangalore (IN); Jitendra Kumar, Bangalore (IN); HEWLETT-PACKARD DEVELOPMENT COMPANY, L.P., Houston, TX (US)

(72) Inventors: Prabir Kumar Goswamee, Bangalore (IN); Jitendra Kumar, Bangalore (IN)

(73) Assignee: Hewlett-Packard Development Company, L.P., Spring, TX (US)

(*) Notice: Subject to any disclaimer, the term of this patent is extended or adjusted under 35 U.S.C. 154(b) by 890 days.

(21) Appl. No.: 14/784,638

(22) PCT Filed: Sep. 18, 2013

(86) PCT No.: PCT/IN2013/000563
§ 371 (c)(1),
(2) Date: Oct. 15, 2015

(87) PCT Pub. No.: WO2014/192008
PCT Pub. Date: Dec. 4, 2014

(65) Prior Publication Data
US 2016/0078513 A1    Mar. 17, 2016

Related U.S. Application Data

(60) Provisional application No. 61/829,427, filed on May 31, 2013.

(51) Int. Cl.
*G06Q 30/06* (2012.01)
*G06Q 10/10* (2012.01)
(Continued)

(52) U.S. Cl.
CPC ....... *G06Q 30/0613* (2013.01); *G06F 3/1226* (2013.01); *G06F 3/1232* (2013.01);
(Continued)

(58) Field of Classification Search
CPC ........ G06Q 30/06–0645; G06Q 30/08; G06Q 50/01; G06Q 10/06; G06Q 10/10;
(Continued)

(56) References Cited

U.S. PATENT DOCUMENTS 7,062,472 B2 * 6/2006 Dan ................ G06Q 10/10
705/317
7,957,019 B2   6/2011 Swift et al.
(Continued)

FOREIGN PATENT DOCUMENTS

CN   1374787 A   10/2002
CN   101539321 A   9/2009
(Continued)

OTHER PUBLICATIONS

International Search Report & Written Opinion received for PCT Application No. PCT/IN2013/000563, dated Mar. 20, 2014, 11 pages.
(Continued)

*Primary Examiner* — Adam L Levine
(74) *Attorney, Agent, or Firm* — HP Inc. Patent Department

(57) ABSTRACT

Systems and methods for managing print services for a customer are described herein. In one example, managing print services for a customer comprises receiving contract data of a managed print services (MPS) contract and collecting device details related to customer devices of the customer. Further, for each of the customer devices, at least one service program to which the customer device is entitled is identified based on the received contract data and the collected device details.

19 Claims, 5 Drawing Sheets

(51) Int. Cl.
*G06Q 10/06* (2012.01)
*G06F 3/12* (2006.01)
*H04N 1/00* (2006.01)

(52) U.S. Cl.
CPC ........... *G06F 3/1287* (2013.01); *G06Q 10/06* (2013.01); *G06Q 10/10* (2013.01); *H04N 1/00007* (2013.01); *H04N 1/00042* (2013.01); *H04N 1/00061* (2013.01); *H04N 1/00244* (2013.01); *H04N 2201/0094* (2013.01)

(58) Field of Classification Search
CPC .... G06F 3/1226; G06F 3/1232; G06F 3/1287; H04N 1/00007; H04N 1/00042; H04N 1/00061; H04N 1/00244; H04N 2201/0094
See application file for complete search history.

(56) References Cited

U.S. PATENT DOCUMENTS

| | | |
|---|---|---|
| 7,962,050 B2 | 6/2011 | Shustef et al. |
| 2006/0221387 A1* | 10/2006 | Swift ..................... G06Q 10/06 358/1.15 |
| 2008/0133384 A1 | 6/2008 | Nagata |
| 2012/0233320 A1* | 9/2012 | Masuda .............. G06F 11/0733 709/224 |
| 2014/0132980 A1* | 5/2014 | Murthy .............. H04N 1/00233 358/1.15 |

FOREIGN PATENT DOCUMENTS

| | | |
|---|---|---|
| CN | 101651766 A | 2/2010 |
| JP | 2003140874 A | 5/2003 |

OTHER PUBLICATIONS

Webpage. Max Out Your Managed Print Services, Managed Print Services—Clarify Imaging Technologies, Inc. 2 pages. http://www.clarityimaging.com/managed.php.

* cited by examiner

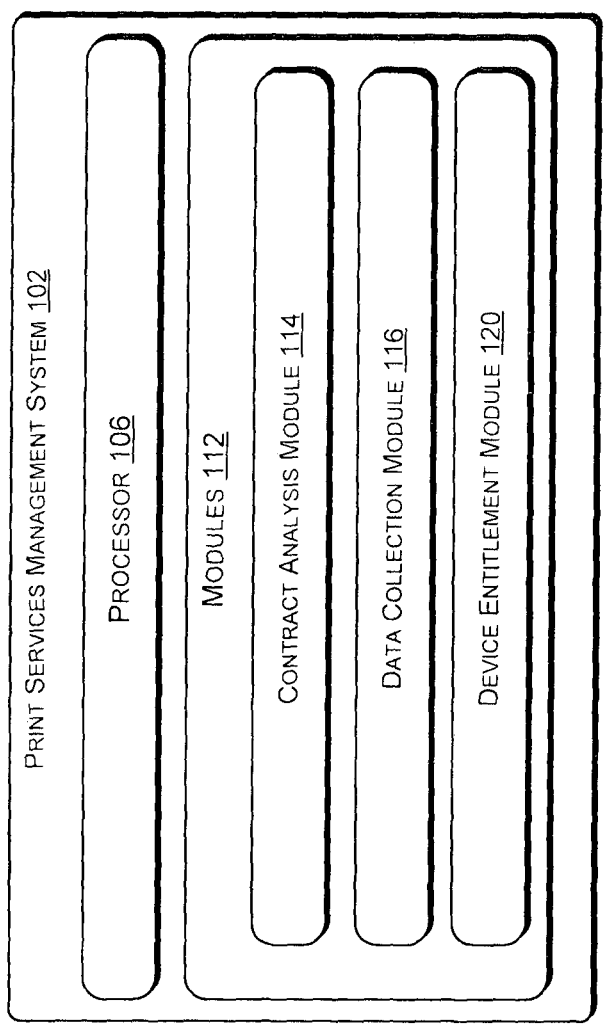

MANAGED PRINT SERVICES

BACKGROUND

Most enterprises have a fleet of devices that includes a mix of different devices for performing various tasks, such as copying, scanning, and printing. Such devices may be procured from different manufacturers and may include devices of different models having varied features and functionalities. Providing support services for each such device may involve the application of different skills and the use of different parts and consumables.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components:

FIG. 1A schematically illustrates a print services management system, according to an example of the present subject matter.

DETAILED DESCRIPTION

Figure 1B:
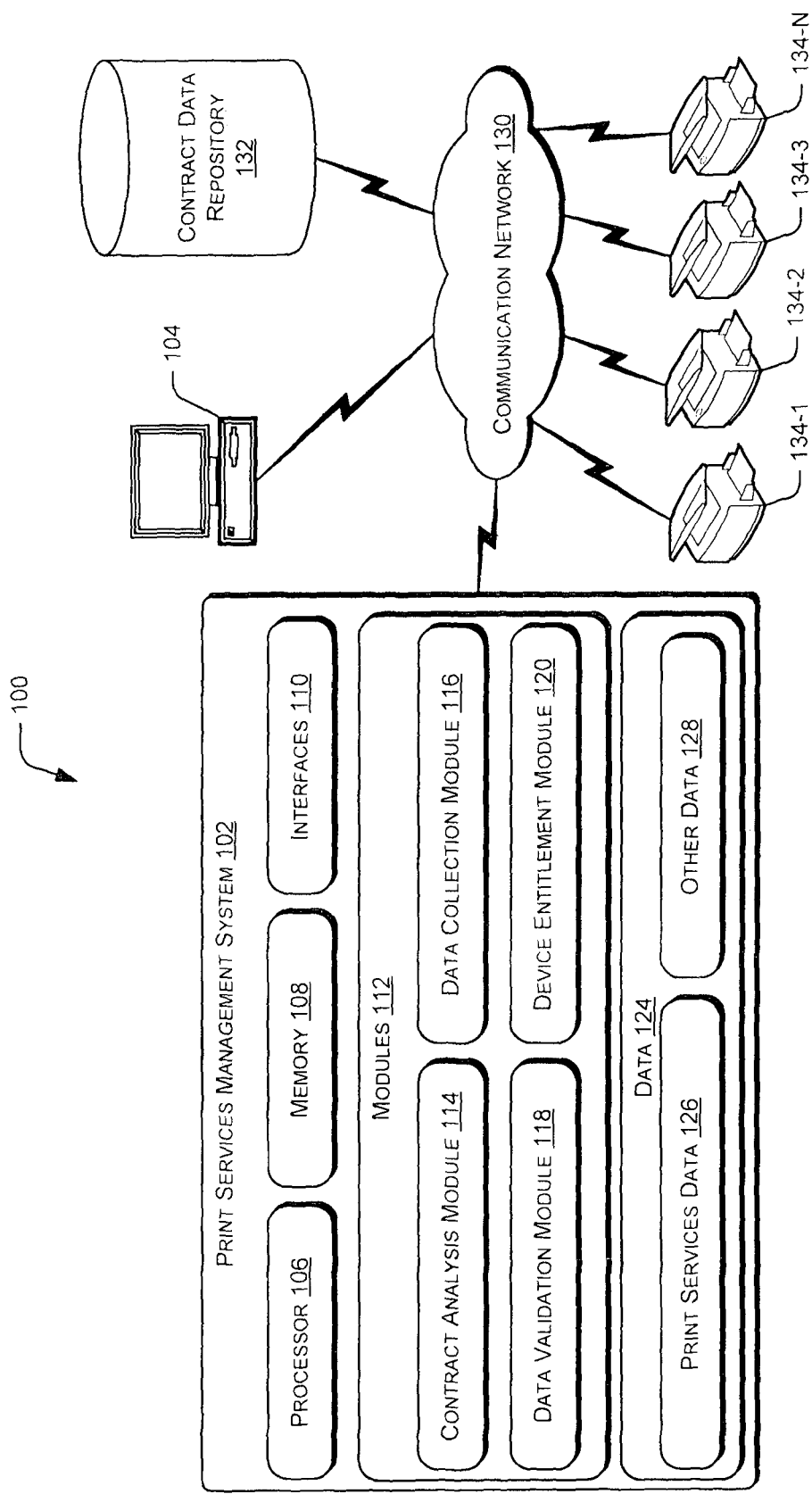
FIG. 1B schematically illustrates a network implementation of the print services management system, according to another example of the present subject matter.

Outsourced managed print services (MPS) are generally used to manage the support services for a fleet of devices in an enterprise. An MPS contract may be executed between the enterprise and a service provider for managing the support services. The service provider may be a third party organization or a specialized department within the enterprise. The MPS contract usually specifies an exhaustive list of services that each device or class of devices in the enterprise's device fleet is entitled to receive. Each of the devices may be accordingly associated with a set of services that it is authorized to receive within the scope of the MPS Contract.

The present subject matter relates to systems and methods for managing print services. The methods and the systems as described herein may be implemented using computing systems.

Generally, providing managed print services (MPS) to a customer based on an MPS contract is a complicated task for a service provider. 'Customer' as used herein may include an enterprise or a company, a university, a group of companies or conglomerate, a group of departments/divisions within a company, or any organization that may have a fleet of devices. The fleet of devices may include, for example, peripheral devices, such as printers, multi-function printers, or scanners, or reproduction devices, such as copiers, or other electronic devices. These devices are also referred to as customer devices.

Typically, when an MPS contract is executed, the service provider may nominate a representative, such as an account manager, to interface with the customer. The customer may similarly nominate a representative, such as an administrator, to interface with the service provider, and particularly with the account manager. Further, one or more users of the customer devices may also interface with the account manager of the service provider for raising service requests based on the MPS contract. User as used herein may refer to the account manager, the administrator or a user of the customer device.

The MPS contract may specify at least one service element for each of the customer devices or for each class of customer devices for providing the managed print services. A service element refers to a unit of service that may be provided for a customer device, and may include performing an identifiable task, or supplying an identifiable part or consumable, or both. Examples of service elements include delivery of toner cartridges, delivery of consumables over the duration of the MPS contract, and delivery and installation of replacement parts. In one example, the MPS contract may specify one or more service elements for each of the customer devices. A bundle of one or more service elements is hereinafter referred to as a service program.

Thus, the MPS contract may specify a service program for each customer device included in the scope of the contract. The service program may be specified based on factors, such as the class of customer devices in which the customer device falls, the location of the device, the department in which the device is used and the usage pattern of the device. For example, a service program having a service element of toner cartridge replacement would be applicable for customer devices being used for printing, including, for example, a multi-function printer capable of performing other functions, such as scanning and sending faxes. However, if a customer device is used for scanning and not for printing, the service program that includes the service element of toner cartridge replacement may not be applicable for the customer device.

Thus, if a customer device is included in the scope of the MPS contract, such a customer device would be entitled or authorized to receive services corresponding to service elements that are included in the service program specified for the customer device in the MPS contract.

In one implementation, the MPS contract may specify the customer devices or classes of customer devices that are included in the scope of the contract, the service program(s) to which each customer device or class of customer devices is entitled, and the service elements that are covered under each of the service programs. In one example, an MPS contract may specify one or more service providers for servicing different customer devices.

For providing services under an MPS contract, an account manager at the service provider end may identify specific customer devices and respective service program(s) included under the MPS contract. Typically, the account manager may have to manually identify the customer devices and the respective service program(s) included under the MPS contact based on an understanding of the contract. The account manager may store such contract information in a service back-end system. Further, in case the customer or the service provider amends the MPS contract to modify the service program(s) applicable to certain customer devices or classes of customer devices during the life of the MPS contract, the account manager has to keep a track of all such changes and update the service back-end system accordingly. The service back-end system is generally a computing system used as a reference for the contract information and for maintaining service logs.

When a customer device is to be serviced, a service request may be raised either by the administrator at the customer end or directly by the customer device. The service request may be sent to the service back-end system, where, based on the contract information, it may be determined whether the service request is to be fulfilled or not. Accordingly, appropriate action may be taken by the service provider.

Thus, as explained above, managing print services based on the MPS contract may involve a variety of complex tasks, such as collection of contract information related to the MPS contract, determination of service program(s) the customer devices are entitled to receive, and, for each of the customer devices, determination of which service element(s) the customer device is entitled to receive based on the service program(s) for the customer device. These tasks are further complicated due to the variety of customer devices, the variety of service programs the customer devices may be entitled to receive, and the various modifications that may take place in the scope of the service programs during the lifetime of the MPS contract. Also, the service back-end system has to be updated with any modifications that take place in the MPS contract to ensure that services are provided as per the updated MPS contract.

The systems and the methods described herein facilitate managing print services for a customer. In one example, the method of managing print services is implemented using a print services management system. The print services management system may be implemented by any computing system, such as a personal computer or a server. In one implementation, the print services management system is connected to the network infrastructure at the customer end and is also connected to the service back-end system.

For initial setup, the print services management system may receive MPS contract data from a user, such as a sales representative of the service provider or an account manager or from an online proposal system that may generate an online service proposal. In one example, the contract data may be received in the form of a structured data model. The print services management system may analyze the data model to identify the components of the MPS contract. The components may be understood to be the service program(s) that each of the customer devices is entitled to receive and the service element(s) that are included in each of the service programs.

Customer device details corresponding to each physical customer device in the device fleet of the customer are also received by the print services management system. In one implementation, the print services management system may automatically discover the physical customer devices connected over the network infrastructure at the customer end and collect the corresponding device details. The device details may include the name of the manufacturer of the customer device, the model number of the customer device, the features of the customer device, and the functionalities of the customer device. Also, in case some of the device details can not be obtained automatically, such device details may be obtained as manual input from, for example, the administrator.

Based on the obtained customer device details, the print services management system may identify which of the customer devices at the customer end are included in the scope of the MPS contract. In one example, the print services management system may identify each customer device based on one or more attributes included in the device details of the customer device. The attributes may be, for example, a customer device sticker number, a product identification number, and a serial number. Further, additional attributes, may be collected and used to determine the service program(s) to which the customer device is entitled. Examples of the additional attributes include a location of the customer device, a department of the customer in which the customer device is installed and a consumable type of the customer device.

On receiving the device details of each physical customer device, the print services management system performs verification and validation of the device details received based on the MPS contract data. In one example, in case the print services management system manages servicing of customer devices for a number of customers, the print services management system may determine whether the customer from which the device details have been obtained can be mapped to one or more MPS contracts and which is the service provider specified in the mapped MPS contracts.

The print services management system may also determine values of device details that are supported by the specified service provider. Further, the print services management system may verify, for each of the customer devices, whether the obtained device details for the customer device match any of the supported values. The print services management system further validates, for each of the customer devices, whether the attributes, such as serial number and Internet Protocol (IP) address, are in accordance with pre-defined syntax formats associated with the attributes. The print services management system also determines whether the additional attributes, such as the location and the department of the customer, are within the scope of the MPS contract.

Thereafter, the print services management system validates the device details by determining whether all the relevant customer attributes of each customer device are available. When any of the attributes of a customer device are not available, the print services management system may generate an appropriate error message based on which the attributes may be provided through manual input by the user.

Further, the print services management system may also perform rule based corrections of the device details. For example, if the model number and manufacturer details for a customer device do not match with any value in the pre-defined set of supported values, the print services management system may correct the data based on user defined rules or past data patterns. For example, Laser Printer 4345 and L_P_4345 may refer to Printer 4345. In one example, the print services management system may correct such errors by using a lookup mechanism, which may be provided by the customer. Further, duplicate entries may be removed from the device details. The print services management system may also facilitate manual validation and verification of the device details, for example, by the administrator and/or the account manager.

After the device details are validated and verified, the print services management system may determine, for each class of customer device or each customer device, at least one service program to which it is entitled. Entitlement determination may be understood as the process by which the print services management system determines, for each class of customer devices or for each customer device, the service program(s) to which the class of customer devices or the customer device is entitled and the applicable price points. The print services management system may perform the entitlement determination based on a comparison of the contract data with the device details.

The print services management system further associates the determined service program(s) with the corresponding class of customer devices or corresponding customer device. In one example, the association between the customer device and the service program(s) that it is entitled to may be stored in a service back-end system as association information.

Based on the stored association information, a customer device may receive the benefit of or otherwise utilize the service(s) that are specified for the customer device within the scope of the MPS contract. For example, in case a printing device runs out of toner cartridge, a service request may be raised by the user with the service back-end system for replacement of the toner cartridge. In another example, the printing device may automatically raise a service request when the printing device detects that the ink level in the toner cartridge is low. Based on the service program(s) associated with the printing device, the service back-end system may place an order with a service provider for replacing the toner cartridge. Further, the service program(s) with which each of the customer devices are associated may also form the basis on which the service provider may maintain accounts and bill the customer.

Thus, the systems and the methods, described herein, facilitate managing print services for a customer. The print services management system provides a robust mechanism which may be implemented for identifying customer devices which are within the scope of the MPS contract. The print services management system also facilitates determination of entitlement of service program(s) for each of the customer devices based on which the customer device may be serviced. For this, the print services management system implements multiple levels of verification and validation of device details of the customer devices that are within the scope of the MPS contract. Hence, the print services management system efficiently implements processes related to MPS contract data management, identification of customer devices, verification and validation of device details, and entitlement determination for the customer devices. Moreover, in case the MPS contract is modified or customer devices are added to or removed from the customer's network infrastructure, the print services management system can efficiently update the service back-end system based on the above mentioned processes.

The above systems and the methods are further described in conjunction with the following figures. It should be noted that the description and figures merely illustrate the principles of the present subject matter. Further, various arrangements may be devised that, although not explicitly described or shown herein, embody the principles of the present subject matter and are included within its spirit and scope.

The manner in which the systems and the methods for managing print services for a customer are implemented are explained in details with respect to FIG. 1A, FIG. 1B, FIG. 2A, FIG. 2B, and FIG. 3. While aspects of described systems and methods for managing print services can be implemented in any number of different computing systems, environments, and/or implementations, the examples and implementations are described in the context of the following system(s).

FIG. 1A schematically illustrates the components of a print services management system 102, according to an example of the present subject matter. In one example, the print services management system 102 may be implemented as any computing system.

In one implementation, the print services management system 102 includes a processor 106 and modules 112 communicatively coupled to the processor 106. In some examples, the modules 112 may include processor executable instructions to perform particular tasks, objects, components, data structures, functionalities, etc., to implement particular abstract data types, or a combination thereof. In some examples, the modules 112 may be implemented as signal processor(s), state machine(s), logic circuitries, and/or any other device or component that manipulates signals based on operational instructions. Further, the modules 112 can be implemented by hardware, by computer-readable instructions stored on a computer-readable medium and executable by a processor, or by a combination thereof. In one implementation, the modules 112 include a contract analysis module 114, a data collection module 116, and a device entitlement module 120.

In one example, the contract analysis module 114 is executable by the processor 106. The contract analysis module 114 receives contract data related to a managed print services (MPS) contract between a customer and a service provider. Based on the received contract data, the contract analysis module 114 analyzes the MPS contract to determine, for each of the customer devices of the customer, at least one service program to which the customer device is entitled under the MPS contract. As mentioned earlier, a service program can be understood as a grouping of one or more service elements, where each service element corresponds to a unit service that may be provided for the customer device by the service provider.

Further, the data collection module 116 identifies each physical customer device of the customer, based on at least one customer device attribute. Based on the identification, the device entitlement module 120 determines, for each customer device, the service program(s) that the customer device is entitled to under the MPS contract, if any. Thereafter, the device entitlement module 120 associates each identified customer device with at least one service program, based on the determination. The operation of the print services management system 102 is described in greater detail in conjunction with FIG. 1B.

FIG. 1B schematically illustrates a network environment 100 including the print services management system 102 according to another example of the present subject matter. The print services management system 102 may be implemented in various computing systems, such as personal computers, servers, and network servers. The print services management system 102 may be implemented at the customer end or at the service provider end. The service provider, in one example, may be an intermediary that manages provisioning of print services to the customer devices through various other service providers.

The print services management system 102 may be communicatively coupled to various user devices 104, which may be implemented as personal computers, workstations, laptops, netbooks, smart-phones, and so on. The user devices 104 may be used by users, such as an account manager or an administrator or other representatives of the customer or the service provider, to provide inputs to or otherwise control the print services management system 102 for managing print services.

In one implementation, the print services management system 102 includes the processor 106, and a memory 108 connected to the processor 106. Among other capabilities, the processor 106 may fetch and execute computer-readable instructions stored in the memory 108.

The memory 108 may be communicatively coupled to the processor 106. The memory 108 can include any non-transitory computer-readable medium including, for example, volatile memory, and/or non-volatile memory. The memory 108 may be, for example, digital memories, magnetic storage media, such as a magnetic disks and magnetic tapes, hard drives, or optically readable digital data storage media.

Further, the print services management system 102 includes various interfaces 110. The interfaces 110 may include a variety of interfaces, for example, interfaces for user device(s), such as data input and output devices, referred to as I/O devices, storage devices, and network devices. The interfaces 110 facilitate communication between the print services management system 102 and various communication and computing devices over various communication networks. The interfaces 110 also facilitate incorporation of the print services management system 102 in an existing information technology infrastructure of the customer or the service provider or the intermediary.

Further, the print services management system 102 may include the modules 112. In said implementation, the modules 112 include the contract analysis module 114, the data collection module 116, a data validation module 118, the device entitlement module 120, and other module(s) (not shown in figure). The other module(s) may include programs or coded instructions that supplement applications or functions performed by the print services management system 102. The modules 112 may be implemented as described above in relation to FIG. 1A.

In an example, the print services management system 102 includes data 124. In said implementation, the data 124 may include print services data 126 and other data 128. The other data 128 may include data generated and saved by the modules 112 for implementing various functionalities of the print services management system 102.

In one implementation, the print services management system 102 may be communicatively coupled to a contract data repository 132 over a communication network 130. The contract data repository 132 may be implemented as computing systems and/or databases which store data of the MPS contract. In one example, the contract data repository 132 may be integrated with the print services management system 102.

The communication network 130 may include the Internet, a Global System for Mobile Communication (GSM) network, a Universal Mobile Telecommunications System (UMTS) network, or any other communication network that use any of the commonly used protocols, for example, Hypertext Transfer Protocol (HTTP), and Transmission Control Protocol/Internet Protocol (TCP/IP), or a combination thereof.

In an example, the print services management system 102 is communicatively coupled with the device fleet of a customer over the communication network 130. The device fleet may comprise various customer devices, such as printers 134-1, 134-2, 134-3, . . . 134-N. The printers 134-1, 134-2, 134-3, . . . 134-N are collectively referred to as customer devices 134.

For the initial setup, a user may provide contract data regarding an MPS contract, entered into by the service provider and the customer, using the contract analysis module 114. In one example, the contract analysis module 114 may generate various user interfaces which may facilitate in capturing of the contract data from authorized users, such as administrators or sales officers or other representatives, of the customer and/or the service providers.

In one example, the contract analysis module 114 may identify, from the contract data, the service program(s) and the service element(s) of each of the service programs that each customer device or each class of customer devices 134 is entitled to. In one implementation, the contract analysis module 114 may determine the service program(s) to which each of the customer devices 134 is entitled, based on the class of the customer device, the location of the customer device, and the department in which the customer device is installed. Further, the contract analysis module 114 may determine, from the contract data, the entity which is responsible for fulfilling the service elements. For example, in certain cases the entity responsible for fulfilling the service elements may be a service provider, whereas in other cases the entity may be a seller of the customer device.

The contract analysis module 114 may also determine the pricing policies for fulfillment of the service elements based on the MPS contract data. The pricing policies may provide the basis on which the service provider would maintain the accounts related to services provided and bill the customer for providing managed print services. One example of a pricing policy may include billing the customer based on a per-instance-of-usage, such as billing based on the number of pages printed or the number of pages scanned. Another example of a pricing policy may be a flat rate charging policy with a cap of a maximum usage level above which additional charges may apply, or without specifying any maximum limit. Yet another example of a pricing policy may include charging based on a minimum charge in addition to per-instance-of-usage basis.

In one example, the contract analysis module 114 may also estimate the costs of providing managed print services and determine the distribution of costs and profits amongst different service providers.

In one example, the contract analysis module 114 may determine price points at which the managed print services are provided for each unique combination of class of the customer device and attributes of the customer device covered by the MPS contract. In one example, the price point for a printer 134-1 installed at a first department of the customer located in a first region may have a price point of x units of currency per page printed in addition to the charges for the service covering installation of toner cartridges, and break-fix parts and labor.

In one implementation, the user may also use the contract analysis module 114 to input or feed various other clauses of the MPS contract into the print services management system 102. For example, the user may provide any special prices and/or discounts that may be applicable based on fulfillment of certain conditions, such as consumption of more than one hundred toner cartridges. Further, other data related to the contract, such as a start date, a signed on date, an activation date, and an expiry date may be fed to the print services management system 102 using the contract analysis module 114.

The user may also use an interface generated by the contract analysis module 114 to provide other parameters of the MPS contract, such as terms and conditions of auto-renewal, auto-entitlement of newly discovered customer devices, authorization of inclusion of a new customer device within the scope of the MPS contract, details of representatives of the service provider and the customer who are responsible for implementation of the MPS contract, terms of payment and conditions under which a customer device is deemed to be outside the scope of the MPS contract. In one example, the contract data collected by the contract analysis module 114 is saved in the contract data repository 132.

In an implementation, the print services management system 102 may be used by a service provider to provide managed print services to two or more customers. Hence, the contract analysis module 114 may store, along with the data of the MPS contract, the details of each of the customers to which the MPS contract relates. This information may be used as a mechanism to filter and control access in a multi-tenanted deployment.

Further, the contract analysis module 114 may also be used to update and amend the MPS contract, for example, for updating renewal and expiry status of the MPS contract, changing the contract expiry date, modifying a service or the price of the service the customer devices 134 are entitled to receive, and adding or removing one or more of the customer devices 134 from the scope of the MPS contract.

In one example, the service provider may also use the contract analysis module 114 to group a collection of service elements as a service program. Further, as mentioned earlier, each service element may be a part of one or more service programs. For example, delivery and installation of toner cartridges may be a part of a base-level service program as well as, a premium-level service program.

The contract analysis module 114 may also be used for initiating processes for collection of device details related to each of the customer devices in the device fleet of the customer. In one example, the processes for the collection of device details may be initiated whenever a new contract is added through the print services management system 102 or when an existing contract is modified. In another example, the processes for the collection of device details may be periodically initiated based on a pre-determined frequency specified by the service provider.

On initiation of the processes for collection of device details related to the customer's device fleet, the data collection module 116 initiates identification of the physical customer devices 134 that may come under the scope of the MPS contract. The data collection module 116 then collects the device details including attributes for each of the identified customer devices 134 for entitlement determination.

In one example, the data collection module 116 identifies the customer for which the device details are collected. The data collection module 116 further identifies the different classes of the customer devices 134 that are present in the network infrastructure of the customer based on various attributes of the customer devices 134, such as model, make, and manufacturer. The data collection module 116 may further identify various instances of the same customer device based on attributes having a unique value, such as an assigned asset identification number, a sticker number, a customer device provided identification number, a location, and a department.

In one example, the data collection module 116 may generate various interfaces to facilitate identification of the customer devices 134 and verification of the device details. The data collection module 116 may also facilitate manual review of the device details to verify, correct or update the collected data. The data collection module 116 may use various mechanisms, such as Simple Network Management Protocol (SNMP), Web Service (WS) discovery, Low End Customer device Model (LEDM), bonjour, Lightweight Directory Access Protocol (LDAP)-walkthrough, and the like, to identify the customer devices 134. In one example, the device details collected by the data collection module 116 using one or more of the aforementioned mechanisms may be further refined by manual data entry. The collected device details are then verified and validated.

The data validation module 118 validates and verifies the device details collected by the data collection module 116. The user may use the data validation module 118 to develop various data validation workflows to ensure correctness and completeness of the device details in relation to the MPS contract. In one example, the data validation module 118 may verify that the customer is under the scope of a valid MPS contract by mapping the customer to a single MPS contract or multiple MPS contracts stored in the contract data repository 132.

Thereafter, the data validation module 118 may check whether the device details related to the customer's device fleet, such as make, model, and manufacturer of each of the customer devices 134, has proper values that match a set of supported values for the service provider. The data validation module 118 also checks and performs rule based correction of the syntaxes of the device details, such as serial number of each of the customer devices 134 and the IP address of each of the customer devices 134. The data validation module 118 may also perform other checks, such as whether the location of a customer device matches with at least one location of the offices of the customer and whether there are duplicate entries. The data validation module 118 may then correct erroneous details by, for example, removing duplicate entries and making rule based corrections.

The data validation module 118 thus ensures that all the attributes of the customer devices 134 which may be used for entitlement determination are present and valid. When any error occurs, the data validation module 118 may generate appropriate error messages for the user. The data validation module 118 may also alert the user of any error which could not be corrected based on pre-defined rules, and may request for user input for corrections. On validation and verification of the device details, the print services management system 102 determines which service program(s) each of the customer devices 134 is entitled to under the MPS contract.

In one example, the device entitlement module 120 determines the service program(s) to which a customer device or a class of customer devices is entitled, based on the contract data and the device details. The device entitlement module 120 can then associate the determined program(s) with the corresponding customer device or class of customer devices and store the information in a service back-end system not shown in the figure).

The service back-end system stores service reference data with respect to each of the customer devices 134, including type, make, model, identity, IP address, serial number, ownership, location, address of site, building, floor, contact and the service(s) that it is authorized to receive, based on the association information determined by the device entitlement module 120. The service reference data may be updated by the device entitlement module 120, for example, when either contract data or device details change. The service reference data in the service back-end system can be referred to by the service provider when a service request is received. For example, a service request may be sent to the service back-end system from a customer device or an account manager of the customer. Upon determining that the customer device is entitled to receive the requested service, the service provider may then provide the requested service and accordingly initiate billing of the customer.

In one implementation, for entitlement determination, the device entitlement module 120 compares attributes of each of the customer devices 134 against the supported customer devices mentioned in the MPS contract to determine the service program(s) to which it is entitled. The device entitlement module 120 also checks if a particular instance of a customer device is entitled to any other service program apart from the service program(s) mentioned for its class. The device entitlement module 120 may identify the specific instance of the customer device based on its attributes, such as model, serial number, IP Address, and media access control (MAC) address. The device entitlement module 120 also assigns a price point for each service element in the service programs(s) which the customer device is entitled to receive, based on the MPS contract.

If the device entitlement module 120 is unable to determine entitlement for a customer device, the device entitlement module 120 may provide an alert to the service provider to determine the entitlement for the customer device based on manual inputs.

Further, if a customer device is covered by more than one active MPS contracts with the customer, the device entitlement module 120 may perform rule based tie breaking. In one example, the tie breaking may be based on at least one of the contract expiry date and the contract start date. In one example, the MPS contract which came into force earlier may be applied, whereas in another example, the MPS contract which expires later may be applied as a result of the tie breaking. Further, the tie breaking rule may be based on price points, customer device attributes, and so on. When the device entitlement module 120 is unable to select an MPS contract from amongst multiple contracts, the device entitlement module 120 may generate a notification requesting the user to select a valid MPS contract which would be applicable for the customer device.

In one example, the device entitlement module 120 may facilitate the user to perform various other functions during the manual entitlement determination process. Examples of such functions include updating of contract data to add new price points for a customer device that does not exist in the contract data, deciding to apply a particular price point to a customer device, and identifying some customer devices that are not to be covered by the MPS contract. The manual entitlement determination may be initiated based on a request by the customer or by the service provider, or based on error messages or notifications generated by the device entitlement module 120.

If the MPS contract specifies that determination of entitlement of a new customer device should follow approval from the customer and/or the service provider, the device entitlement module 120 may initiate a pre-defined authorization workflow to get the appropriate authorization.

The device entitlement module 120 also supports scenarios in which the customer's device fleet is managed by two or more competitive MPS contracts. In such scenarios, based on the attributes of a customer device, the device entitlement module 120 may determine the service program (s) to which the customer device is entitled and the service provider that will service the customer device. From the perspective of the service provider, depending on which of the customer devices 134 are determined to be entitled to respective service program(s), some portion of the customer's device fleet may show up as in-contract and some portion may show as un-managed, i.e., not within the scope of the MPS contract of that service provider.

Further, the device entitlement module 120 may also determine dis-entitlement for one or more of the customer devices 134. When a customer device is dis-entitled, the customer device may no longer be associated with any service entitlement under the MPS contract. The dis-entitlement may occur for various reasons, such as end of contract, non-renewal of contract, termination of contract, request by customer, and based on a decision of the service provider or the customer. Based on dis-entitlement determination, the device entitlement module 120 may update the service back-end system and remove the association between the customer device to be dis-entitled and the previously associated service program(s).

Thus, the print services management system 102 provides a robust mechanism which may be implemented for providing managed print services to customer devices 134 which are within the scope of an MPS contract. The print services management system 102 further determines entitlement of each of the customer devices 134 based on analyzed contract data and collected device details. The print services management system 102 also implements multiple levels of verification and validation of device details related to the customer devices 134 within the scope of the MPS contract. Hence, the print services management system 102 facilitates entitlement determination and managing print services for the customer devices 134.

Figure 2A:
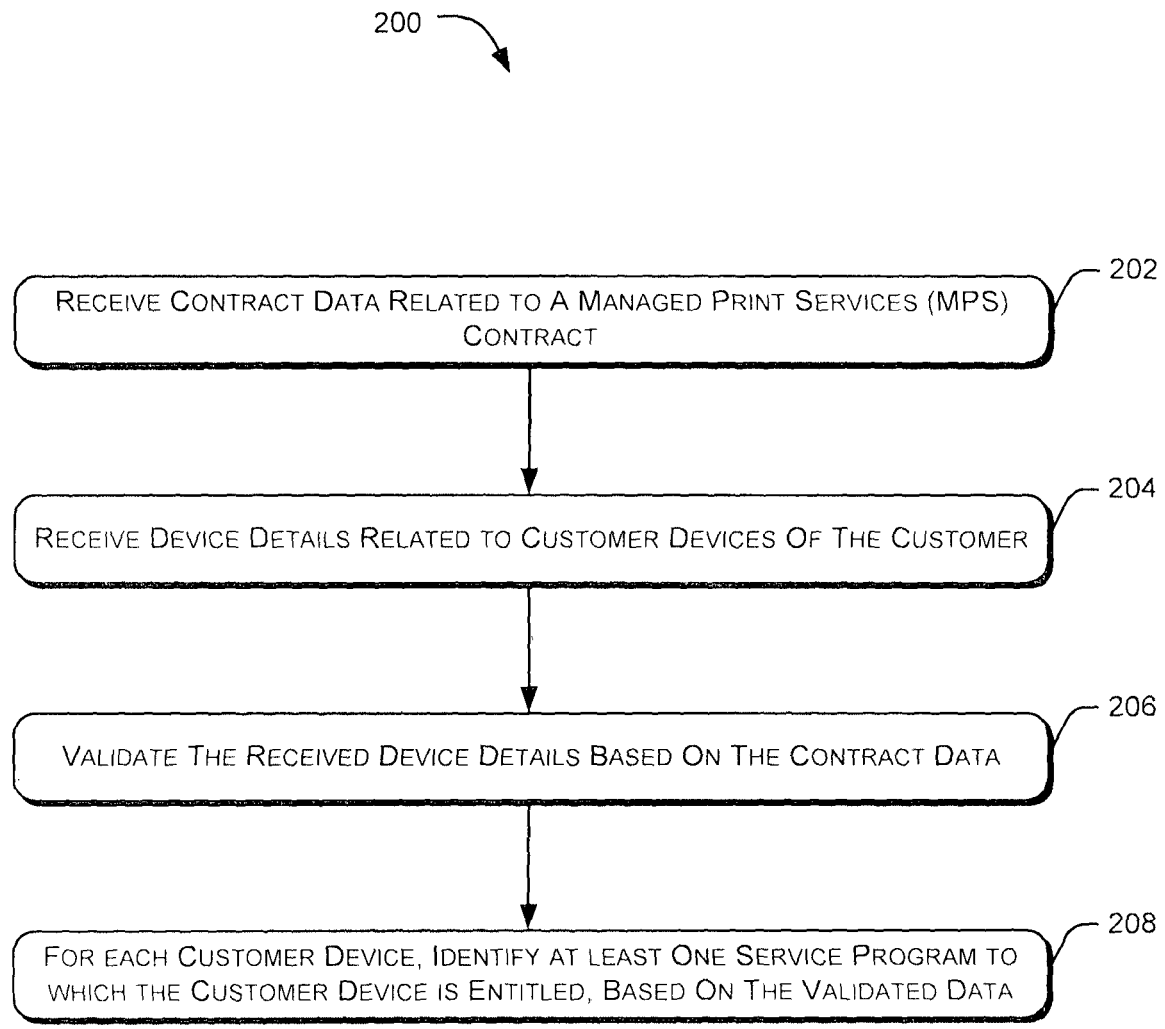
FIG. 2A illustrates a method for managing print services, according to an example of the present subject matter.
Figure 2B:
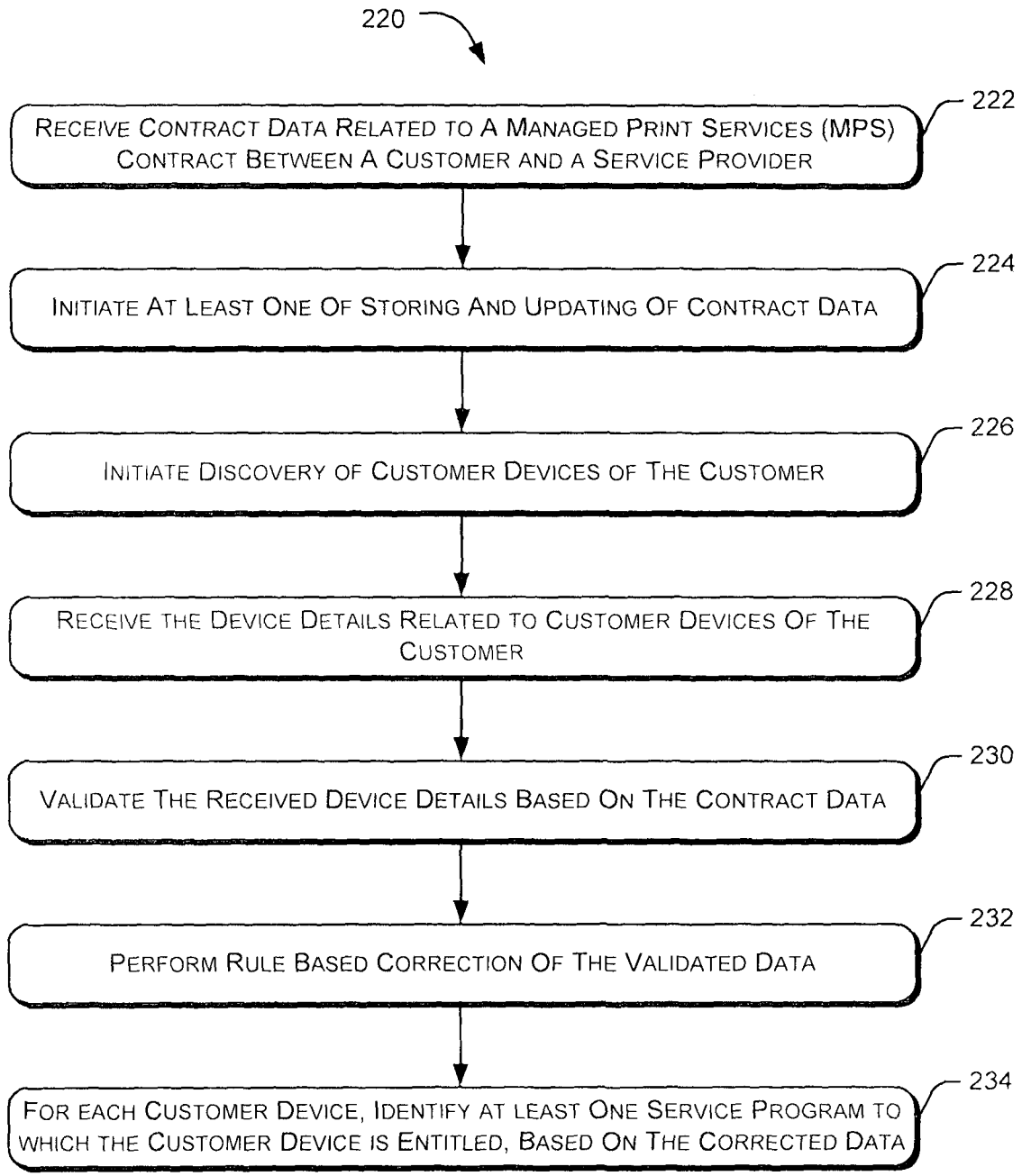
FIG. 2B illustrates a method for managing print services, according to another example of the present subject matter.

FIGS. 2A and 2B illustrate methods 200 and 220 for managing print services, according to examples of the present subject matter. The order in which the methods 200 and 220 are described is not intended to be construed as a limitation, and some of the described method blocks can be combined in a different order to implement the methods 200 and 220, or an alternative method. Additionally, individual blocks may be deleted from the methods 200 and 220 without departing from the spirit and scope of the subject matter described herein. Furthermore, the methods 200 and 220 may be implemented in any suitable hardware, computer-readable instructions, or combination thereof.

The steps of the methods 200 and 220 may be performed by either a computing device under the instruction of machine executable instructions stored on a computer readable medium or by dedicated hardware circuits, microcontrollers, or logic circuits. Herein, some examples are also intended to cover computer readable medium, for example, digital data storage media, which are machine or computer readable and encode machine-executable or computer-executable instructions, where said instructions perform some or all of the steps of the described methods 200 and 220.

With reference to method 200 as depicted in FIG. 2A, contract data related to an MPS contract entered into between a service provider and a customer is received at block 202. In one implementation, a user may use the contract analysis module 114 to feed the details of the MPS contract, or contract data, into the print services management system 102.

As shown in block 204, device details related to the customer devices 134 in the customer's device fleet is received. In one example, the data collection module 116 collects the device details. The device details may be collected based on an automated discovery of the customer devices 134 or a manual entry of the device details or a combination of the two.

As illustrated in block 206, the received device details are validated based on the MPS contract. In one example, the data validation module 118 validates the received device details based on the contract data to generate validated data.

As depicted in block 208, for each customer device, at least one service program to which the customer device is entitled is determined based on the validated data. In one example, the device entitlement module 120 may determine customer device entitlement based on the validated data. The customer device entitlement determination mechanism has been explained earlier in conjunction with FIG. 1B.

With reference to method 220 as depicted in FIG. 2B, contract data related to an MPS contract of a customer is received at block 222. In one implementation, a user may use the contract analysis module 114 to feed the contract data into the print services management system 102.

As shown in block 224, at least one of storing and updating of contract data is initiated. In one example, in the case of existing customers, the contract analysis module 114 may update the contract data in a contract data repository 132. In another example, in the case of new customers, the contract analysis module 114 may generate data structures for storing the details of the MPS contract in the contract data repository 132.

As depicted in block 226, discovery of physical customer devices of the customer is initiated. In one example, the data collection module 116 performs the device discovery for the customer devices.

As illustrated in block 228, the device details related to the customer devices of the customer's device fleet are received. In one example, the data collection module 116 receives device details of each of the customer devices 134 of the customer's device fleet. The data may be collected based on an automated discovery of the customer devices or a manual entry of the device details or a combination of automated discovery and manual entry.

At block 230, the received data is validated based on the contract data. In one example, the data validation module 118 validates the received data based on the contract data to generate validated data.

As illustrated at block 232, the validated data is corrected based on at least one of rules and user inputs to generate corrected data. In one example, the data validation module 118 may perform rule based corrections in the validated data, such as correction in syntaxes of the values of the attributes present in the device details. Further, the data validation module 118 may generate notification for manual corrections when rule based corrections fail to rectify the detected errors.

As depicted in block 234, for each of the customer devices, at least one service program to which the customer device is entitled is determined based on the corrected data and the contract data. The customer device entitlement determination mechanism has been explained in detail in conjunction with FIG. 1B.

Figure 3:
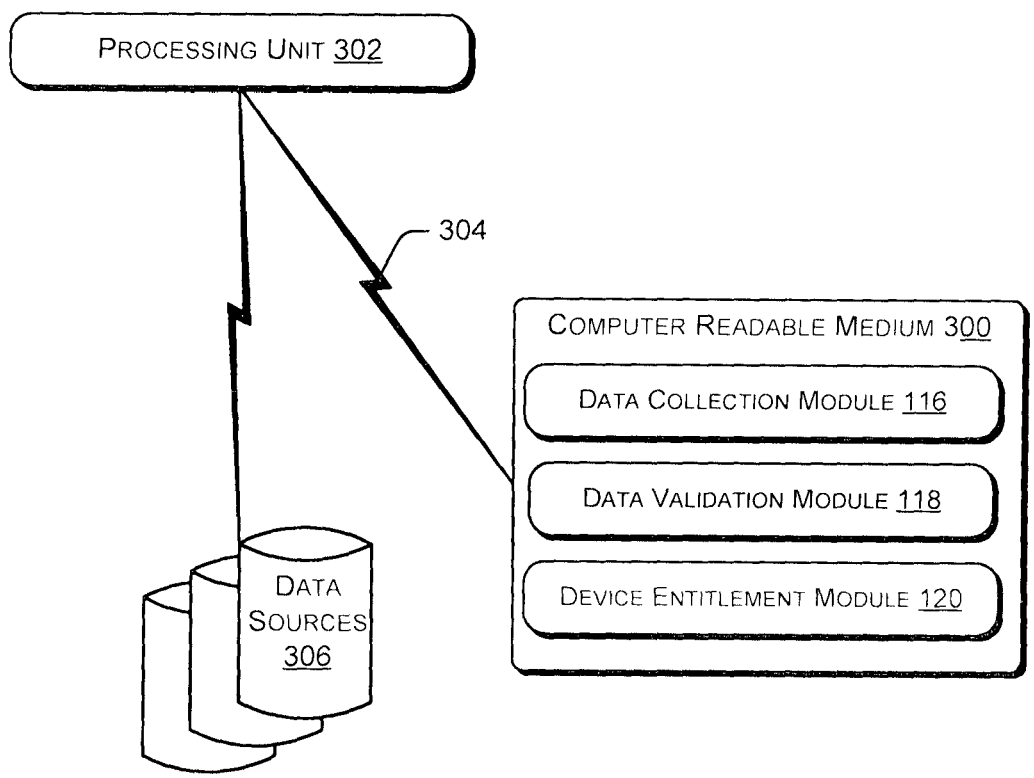
FIG. 3 illustrates a computer readable medium storing instructions for managing print services, according to an example of the present subject matter.

FIG. 3 illustrates a computer readable medium 300 storing instructions for managing print services, according to an example of the present subject matter. In one example, the computer readable medium 300 is communicatively coupled to a processing unit 302 over communication link 304.

For example, the processing unit 302 can be a computing device, such as a server, a laptop, a desktop, a mobile device, and the like. The computer readable medium 300 can be, for example, an internal memory device or an external memory device, or any non-transitory computer readable medium. In one implementation, the communication link 304 may be a direct communication link, such as any memory read/write interface. In another implementation, the communication link 304 may be an indirect communication link, such as a network interface. In such a case, the processing unit 302 can access the computer readable medium 300 through a network.

The processing unit 302 and the computer readable medium 300 may also be communicatively coupled to data sources 306 over the network. The data sources 306 can include, for example, databases and computing devices. The data sources 306 may be used by the customers and the service providers to communicate with the processing unit 302.

In one implementation, the computer readable medium 300 includes a set of computer readable instructions, such as the data collection module 116, the data validation module 118, and the device entitlement module 120. The set of computer readable instructions can be accessed by the processing unit 302 through the communication link 304 and subsequently executed to perform acts for providing managed print services.

On execution by the processing unit 302, the data collection module 116 collects device details related to the customer devices 134 of the customer's device fleet. In one example, the collected device details include attributes of the customer devices 134. Thereafter, the data validation module 118 checks for and corrects any errors in at least one of the values of the attributes of the customer devices 134 and the syntaxes of the values of the attributes of the customer devices 134. In one example, the data validation module 118 performs the correction based on at least one of pre-defined rules and lookup tables. After validation, the device entitlement module 120 initiates entitlement determination of the customer devices based on the corrected data and contract data related to an MPS contract entered into by the customer.

Although implementations for managing print services have been described in language specific to structural features and/or methods, it is to be understood that the appended claims are not necessarily limited to the specific features or methods described. Rather, the specific features and methods are disclosed as examples of systems and methods for managing print services.

What is claimed is:

1. A print services management system, for managing print services, comprising:
 a processor;
 a data collection module executable by the processor to:
  identify customer devices of a customer; and
  collect device details related to the customer devices of the customer, wherein the device details include attributes of each of the customer devices;
 a contract analysis module executable by the processor to:
  receive contract data corresponding to a managed print services (MPS) contract between the customer and a service provider; and
  generate a user interface to capture the contract data from an authorized user, the contract data to be captured including at least one of:
   a contract clause to be entered in the MPS contract; and
   a contract parameter for the MPS contract, the contract parameter relating to at least one of terms and conditions of the MPS contract and a customer device;
 a data validation module executable by the processor to:
  verify and validate the attributes based on a comparison of the attributes with the contract data; and
  correct at least one of values and syntaxes of the attributes of the customer devices based on at least one of pre-defined rules and lookup tables to generate corrected data; and
 an entitlement module executable by the processor to:
  determine, for each of the identified customer devices, at least one service program to which the customer device is entitled in the MPS contract based on the validated and corrected attributes and the contract data;
  associate the at least one service program with the customer device;
  determine that the customer device is entitled to two or more MPS contracts including the MPS contract;

utilize a rule based tie breaking to attempt to select one of the two or more MPS contracts to apply to the customer device;

determine that utilization of the rule based tie breaking was unsuccessful in selecting one of the two or more MPS contracts to apply to the customer device; and in response to determining that utilization of the rule based tie breaking was unsuccessful in selecting one of the two or more MPS contracts to apply to the customer device, generate a notification to the authorized user.

2. The print services management system as claimed in claim 1, wherein the entitlement module is executable by the processor to determine at least one of price points and pricing policies for each of the identified customer devices based on at least one of a class of the customer device and attributes of the customer device.

3. The print services management system as claimed in claim 1, wherein the contract analysis module is further executable by the processor to determine at least one of a start date of the MPS contract, an expiry date of the MPS contract, renewal conditions of the MPS contract, payment options of the MPS contract, and the service provider specified in the MPS contract for fulfilling the at least one service program.

4. The print services management system as claimed in claim 1, wherein the data collection module is further executable by the processor to identify each of the customer devices of the customer based on at least one of Simple Network Management Protocol (SNMP), Web Service (WS) discovery, Low End Customer device Model (LEDM), bonjour, and Lightweight Directory Access Protocol (LDAP)-walkthrough.

5. The print services management system as claimed in claim 1, wherein the device entitlement module is further executable by the processor to:

remove previous associations between the customer device and at least one corresponding service program.

6. The print services management system as claimed in claim 1, wherein the data collection module is further executable by the processor to identify at least one of locations of each of the customer devices and departments in which each of the customer devices are installed.

7. The print services management system as claimed in claim 1, wherein the data collection module is further executable by the processor to collect attributes of each of the customer devices based on at least one of internet protocol (IP) addresses of each of the customer devices, media access control (MAC) addresses of each of the customer devices, and serial numbers of each of the customer devices.

8. A non-transitory computer-readable medium storing instructions executable by a print services management system having a processor to perform processing comprising:

identifying, by the processor of the print services management system, customer devices of a customer;

collecting, by the processor of the print services management system, device details related to the customer devices of the customer, wherein the device details include attributes of each of the customer devices;

receiving, by the processor of the print services management system, contract data corresponding to a managed print services (MPS) contract between the customer and a service provider;

generating, by the processor of the print services management system, a user interface to capture the contract data from an authorized user, the contract data to be captured including at least one of:

a contract clause to be entered in the MPS contract; and a contract parameter for the MPS contract, the contract parameter relating to at least one of terms and conditions of the MPS contract and a customer device;

verifying and validating, by the processor of the print services management system, the attributes based on a comparison of the attributes with the contract data;

correcting, by the processor of the print services management system, at least one of values and syntaxes of the attributes of the customer devices based on at least one of pre-defined rules and lookup tables to generate corrected data;

determining, by the processor of the print services management system, for each of the identified customer devices, at least one service program to which the customer device is entitled in the MPS contract based on the validated and corrected attributes and the contract data;

associating, by the processor of the print services management system, the at least one service program with the customer device;

determining, by the processor of the print services management system, that the customer device is entitled to two or more MPS contracts including the MPS contract;

utilizing, by the processor of the print services management system, a rule based tie breaking to attempt to select one of the two or more MPS contracts to apply to the customer device;

determining, by the processor of the print services management system, that utilization of the rule based tie breaking was unsuccessful in selecting one of the two or more MPS contracts to apply to the customer device; and in response to determining that utilization of the rule based tie breaking was unsuccessful in selecting one of the two or more MPS contracts to apply to the customer device, generating, by the processor of the print services management system, a notification to the authorized user.

9. The non-transitory computer-readable medium as claimed in claim 8, wherein the processing further comprises determining at least one of price points and pricing policies for each of the identified customer devices based on at least one of a class of the customer device and attributes of the customer device.

10. The non-transitory computer-readable medium as claimed in claim 8, wherein the processing further comprises determining at least one of a start date of the MPS contract, an expiry date of the MPS contract, renewal conditions of the MPS contract, payment options of the MPS contract, and the service provider specified in the MPS contract for fulfilling the at least one service program.

11. The non-transitory computer-readable medium as claimed in claim 8, wherein the processing further comprises identifying each of the customer devices of the customer based on at least one of Simple Network Management Protocol (SNMP), Web Service (WS) discovery, Low End Customer device Model (LEDM), bonjour, and Lightweight Directory Access Protocol (LDAP)-walkthrough.

12. The non-transitory computer-readable medium as claimed in claim 8, wherein the processing further comprises removing previous associations between the customer device and at least one corresponding service program.

13. The non-transitory computer-readable medium as claimed in claim 8, wherein the processing further comprises identifying at least one of locations of each of the customer devices and departments in which each of the customer devices are installed.

14. A method comprising:
identifying, by a processor of a print services management system, customer devices of a customer;
collecting, by the processor of the print services management system, device details related to the customer devices of the customer, wherein the device details include attributes of each of the customer devices;
receiving, by the processor of the print services management system, contract data corresponding to a managed print services (MPS) contract between the customer and a service provider;
generating, by the processor of the print services management system, a user interface to capture the contract data from an authorized user, the contract data to be captured including at least one of:
  a contract clause to be entered in the MPS contract; and
  a contract parameter for the MPS contract, the contract parameter relating to at least one of terms and conditions of the MPS contract and a customer device;
verifying and validating, by the processor of the print services management system, the attributes based on a comparison of the attributes with the contract data;
correcting, by the processor of the print services management system, at least one of values and syntaxes of the attributes of the customer devices based on at least one of pre-defined rules and lookup tables to generate corrected data;
determining, by the processor of the print services management system and for each of the identified customer devices, at least one service program to which the customer device is entitled in the MPS contract based on the validated and corrected attributes and the contract data;
associating, by the processor of the print services management system, the at least one service program with the customer device;
determining, by the processor of the print services management system, that the customer device is entitled to two or more MPS contracts including the MPS contract;
utilizing, by the processor of the print services management system, a rule based tie breaking to attempt to select one of the two or more MPS contracts to apply to the customer device;
determining, by the processor of the print services management system, that utilization of the rule based tie breaking was unsuccessful in selecting one of the two or more MPS contracts to apply to the customer device; and
in response to determining that utilization of the rule based tie breaking was unsuccessful in selecting one of the two or more MPS contracts to apply to the customer device, generating, by the processor of the print services management system, a notification to the authorized user.

15. The method as claimed in claim 14, further comprising determining at least one of price points and pricing policies for each of the identified customer devices based on at least one of a class of the customer device and attributes of the customer device.

16. The method as claimed in claim 14, further comprising determining at least one of a start date of the MPS contract, an expiry date of the MPS contract, renewal conditions of the MPS contract, payment options of the MPS contract, and the service provider specified in the MPS contract for fulfilling the at least one service program.

17. The method as claimed in claim 14, further comprising identifying each of the customer devices of the customer based on at least one of Simple Network Management Protocol (SNMP), Web Service (WS) discovery, Low End Customer device Model (LEDM), bonjour, and Lightweight Directory Access Protocol (LDAP)-walkthrough.

18. The method as claimed in claim 14, further comprising removing previous associations between the customer device and at least one corresponding service program.

19. The method as claimed in claim 14, further comprising identifying at least one of locations of each of the customer devices and departments in which each of the customer devices are installed.

* * * * *